November 24, 1959

2,914,557
POLYAMINE NAPHTHENATES

William F. Oxford, Jr., Beaumont, Tex., assignor to Sun Oil Company, Philadelphia, Pa., a corporation of New Jersey No Drawing. Application June 9, 1955
Serial No. 514,371
10 Claims. (Cl. 260—501)

This invention relates to new compositions having beneficial corrosion-inhibiting properties and other useful properties.

The new compositions according to the invention are petroleum naphthenic acid salts of (1) a polyamine compound having the formula $RNH[(CH_2)_mNH]_nH$ where R is hydrogen or the hydrocarbon radical of a naturally occurring fatty acid RCOOH, where $m$ is an integer from 2 to 5 and preferably 2 or 3, and where $n$ is an integer from 1 to 10, or (2) an N-hydroxyalkyl derivative of a compound having that formula, or (3) an N-polyoxyalkylene derivative of a compound having that formula; the naphthenic acids employed have saponification number on the oil-free basis not substantially greater than 200 mg. of KOH per gram, and an average number of carbon atoms per molecule of at least about 18; the polyamine compound (1) has an average of at least 12 carbon atoms per molecule and generally not more than 30 carbon atoms per molecule. The hydroxyalkyl and polyoxyalkylene derivatives can be prepared in known manner by reaction of an alkylene oxide, e.g. ethylene oxide, propylene oxide, 1,2-epoxybutane, 1-methyl-2,3-epoxybutane, etc., with the nitrogen compound in question. The hydroxyalkyl and polyoxyalkylene groups in the derivative contain a total of 2 to 10 carbon atoms inclusive, which may be contained in one or more hydroxyalkyl or polyoxyalkylene groups. A polyoxyalkylene derivative according to the present invention is a compound having one or more groups containing ether linkages, e.g. $-CH_2CH_2OCH_2CH_2OH$, etc.

When $n$ in the above formula is greater than 5, R is preferably hydrogen or an alkyl group having less than 5 carbon atoms. When $n$ is 5 or less, R may in some instances be an alkyl group having a greater number of carbon atoms. When $n$ is 1, R preferably has 11 to 20 carbon atoms, more preferably at least 15 carbon atoms. In the latter case, R can advantageously be the hydrocarbon radical of a natural fatty acid mixture RCOOH, e.g. tallow acids, soya acids, cocoa acids, etc., a mixture of amines therefore being employed.

In one embodiment, the compositions according to the invention are petroleum naphthenic acid salts of a polyamine residue obtained in the reaction of an alkylene dihalide, e.g. ethylene dichloride, with a nitrogen base, e.g. ammonia, to produce alkylene amines, after distillation of lower boiling alkylene amines, for example those having the formula $NH_2(CH_2CH_2NH))_nH$ where $n$ is 1, 1 to 2, 1 to 3, 1 to 4, etc. Such residue may be blended back, if desired, with a distillate alkylene amine.

Suitable amines for use according to the invention include the following: N-dodecyl ethylene diamine, N-octadecyl ethylene diamine, N-hexadecyl trimethylene diamine, N-octadecyl tetramethylene diamine, N-octyl diethylene triamine, N-hexyl triethylene tetramine, N-butyl tetraethylene pentamine, N-octadecyl tetraethylene pentamine, N-hydroxyethyl N'-dodecyl ethylene diamine, N,N'-di(hydroxyethyl)-N'-octadecyl ethylene diamine, N-ethoxyethanol-N'-octadecyl ethylene diamine, etc. Mixtures of amines can also be employed.

Petroleum naphthenic acids are cyclic carboxylic acids recoverable from petroleum by known procedures. The acids employed according to the invention are the relatively high molecular weight acids, for example those which boil in the same range of temperatures as lubricating oil. The acids employed are preferably mixtures boiling through a range of at least 75 Fahrenheit degrees at 2 mm. of Hg and frequently the mixtures boil through a range of at least 150 Fahrenheit degrees at 2 mm. of Hg.

The salts which constitute the new compounds of the invention may be either basic or neutral. Basic salts can be prepared by reacting a polyamine with less than the amount of naphthenic acids required to neutralize all of the amino groups in the polyamine. Neutral salts can be prepared by reacting a polyamine with the amount of naphthenic acids required to neutralize all of the amino groups in the polyamine.

The new compounds of the invention are useful for a variety of purposes, e.g. as corrosion inhibiting and detergent additives for petroleum fractions such as kerosene, lubricating oil, etc., as anti-sludging additives for petroleum fuels, as emulsifying agents, etc. They also may be useful as bactericidal or bacteriostatic agents. They are particularly useful for inhibiting corrosion of metal equipment used in production and transportation of oil well fluids, including gas well fluids and gas condensate well fluids and water associated with hydrocarbon production, e.g. water used in secondary recovery, pressure maintenance, or water flooding; this water may be either produced brine or water from a supply well. The salts can be commingled with the well fluids in any suitable manner, e.g. by introducing them, either alone or dissolved in a suitable solvent such as an aromatic hydrocarbon solvent, into the well tubing or into the annulus between the tubing and the casing. The inhibitor can alternatively be incorporated in a solid stick inhibitor containing microcrystalline wax or other suitable material. The injection practices which are known for use with other organic inhibitors are generally suitable for use with the present inhibitor. Preferably, the inhibitor is added to the corrosive well fluids in amounts of 25 to 1000 p.p.m. based on the well fluids, e.g. a mixture of crude oil and brine, more preferably 100 to 500 p.p.m. In addition to their corrosion inhibiting properties, the salts have detergency characteristics which make them useful in maintaining metal surfaces of well production equipment in clean condition, and in removing corrosion products or scale from corroded metal surfaces.

The following examples illustrate the invention:

Example I

A mixture of neutral salts produced by neutralizing petroleum naphthenic acids with a diamine material known by the trade mark "Duomeen T" was prepared.

Duomeen T comprises a mixture of diamines having the formula $RNHCH_2CH_2CH_2NH_2$ where R is a hydrocarbon radical derived from tallow fatty acids, the average molecular weight of the mixture of diamines being 320. Since the mixture of diamines is not pure, the combining weight of Duomeen T is about 400.

The naphthenic acids employed conformed in preparation and properties to those sold commercially under the trade mark "Sunaptic Acids A." Typical properties for such acids are the following: acid number 178 mg. of KOH per gram, average molecular weight 297, average molecular formula $C_{19}H_{34}O_2$, average type formula $C_nH_{2n-4}O_2$, and distillation range 315–485° F./2 mm. Hg (0–95%).

The mixture of salts was produced by stirring together the naphthenic acids with the mixture of diamines, thereby to produce a mixture of diamine dinaphthenates having average molecular weight of about 914. Slightly more than two moles of naphthenic acids per 400 parts by weight of Duomeen T were employed. The resulting mixture of salts varied from one salt to the next not only in the diamine residue but also in the acid residue since the naphthenic acids used were also a mixture of acids having varying molecular weight and chemical structure.

The mixture of salts was a viscous liquid at room temperature and had the following properties: Saybolt Universal viscosity at 120° F. of about 8700 seconds, A.P.I. gravity at 60° F. of about 16.4, and refractive index of about 1.4966.

The Duomeen T dinaphthenates were tested for their ability to inhibit corrosion of mild steel in the presence of air by mixtures of severely corrosive sour West Texas crude saturated with hydrogen sulfide, and of brine saturated with hydrogen sulfide and carbon dioxide. The salts were found to be highly satisfactory, providing for example 98.5 percent protection in a 24-hour test at room temperature in a bottle on the periphery of a drum rotated at about 100 revolutions per minute, using the salts in 200 p.p.m. concentration based on the mixture of oil and brine.

*Example II*

Duomeen T mononaphthenates, i.e. basic salts, were prepared, employing naphthenic acids conforming in preparation and properties to those sold commercially as "Sunaptic Acids C." Typical properties for such acids are the following: acid number 122 mg. of KOH per gram, average molecular weight 415, average molecular formula $C_{28}H_{49}O_2$, average type formula $C_nH_{2n-7}O_2$, and distillation range 408–596° F./2 mm. Hg (0–95%). The Duomeen T mononaphthenates were prepared by reacting 415 parts by weight of naphthenic acids with slightly more than 400 parts by weight of Duomeen T. The resulting mixture of salts was a viscous liquid at room temperature and had the following properties: Saybolt Universal viscosity at 130° F. of about 2500 seconds, A.P.I. gravity at 60° F. of about 19.5, and refractive index of about 1.4977.

In a test procedure similar to that described in Example I, the Duomeen T mononaphthenates were found to provide, for example, 98.9 percent protection at 200 p.p.m. concentration, thus showing great effectiveness as an inhibitor of corrosion normally caused by oil well fluids.

The physical properties of the compositions according to the invention vary according to the nature of the naphthenic acids employed, as well as according to the nature of the polyamine employed. Thus Duomeen T dinaphthenates prepared from naphthenic acids ranging in average molecular weight from 297 to 415 have Saybolt Universal viscosities at 130° F. ranging from about 8700 to about 20,400, A.P.I. gravities at 60° F. ranging from about 16.4 to about 15.5, and refractive index ranging from about 1.4966 to about 1.5067. Corresponding mononaphthenates have Saybolt Universal viscosities at 130° F. ranging from about 1400 to about 2500, A.P.I. gravities at 60° F. ranging from about 20.7 to about 19.5, and refractive index ranging from about 1.4904 to about 1.4977.

*Example III*

Ethoxylated Duomeen T dinaphthenates were prepared, employing naphthenic acids conforming in preparation and properties to those sold commercially as "Sunaptic Acids B." Typical properties for such acids are the following: acid number 159 mg. of KOH per gram, average molecular weight 330, average molecular formula $C_{21}H_{37}O_2$, average type formula $C_nH_{2n-5}O_2$, and distillation range 287–530° F./2 mm. Hg (0–98%). The ethoxylated Duomeen T dinaphthenates were prepared by reacting 660 parts by weight of the naphthenic acids with slightly less than 488 parts by weight of ethoxylated Duomeen T, the latter having been prepared by reacting two moles of ethylene oxide under known ethoxylation conditions with one mole of Duomeen T. The possible reaction products obtained include the following:

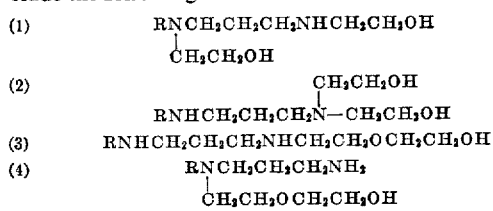

The actual reaction products obtained probably were a mixture of reaction products (1), (2) and (3) and possibly (4).

In a test procedure similar to that described in Example I, the ethoxylated Duomeen T dinaphthenates were found to provide, for example, 97.5 percent protection at 200 p.p.m. concentration, thus showing great effectiveness as an inhibitor for corrosion normally caused by oil well fluids.

*Example IV*

Duomeen T mononaphthenates and dinaphthenates were prepared from each of the three naphthenic acid fractions described in Examples I, II and III, and the effectiveness of the six materials as inhibitors of corrosion normally caused by oil well fluids was compared with the effectiveness for such purpose of six materials obtained by preparing Duomeen T mononaphthenates and dinaphthenates of each of three naphthenic acid fractions, each fraction having an average of 15 or 16 carbon atoms per molecule, as compared with the 19 to 28 carbon atoms of the naphthenic acids used in Examples I, II and III. The following table shows a comparison of the average protection provided by the six higher molecular weight salts and by the six lower molecular weight salts:

| No. of C atoms in acids | Percent Protection | |
|---|---|---|
| | At 100 p.p.m. | At 50 p.p.m. |
| 19 to 28 | 91 | 78 |
| 15 to 16 | 81 | 16 |

These results show that salts prepared from the higher molecular weight acids according to the invention show substantial superiority, as well corrosion inhibitors at 100 p.p.m., to salts prepared from lower molecular weight naphthenic acids, and great superiority to the latter salts as well corrosion inhibitors at 50 p.p.m.

*Example V*

A mixture of salts produced by reaction petroleum naphthenic acids with a diamine material known by the trade mark "Polyamine H Special" was prepared.

Polyamine H Special is a mixture of 25 weight percent diethylene triamine and 75 weight percent of a residue obtained in the preparation of polyalkylene polyamines by the reaction of ethylene dichloride and ammonia; the mixture has an equivalent weight of 40. The residue contains those constituents of the reaction products which are higher boiling than tetraethylene pentamine. The residue probably comprises polyalkylene polyamines having the formula $$H_2N(CH_2CH_2NH)_nH$$

wherein $n$ is an integer greater than 4; it also comprises compounds having tertiary nitrogen atoms, as in the case where an aminoethyl group attaches to a secondary nitrogen atom of triethylene tetramine or a higher polyalkylene polyamine; the residue also comprises cyclic amines, derivatives of piperazine, formed by cyclization of compounds containing at least two nitrogen atoms and two ethylene groups.

The naphthenic acids used were generally similar to those described in Example I and had acid number of about 170 mg. of KOH per gram.

The mixture of salts was produced by stirring together 89 grams of the naphthenic acids with 11 grams of the polyamines, thereby to produce a mixture of polyamine naphthenates. This mixture was found to be soluble in kerosine but to have poor solubility in water.

In a test procedure similar to that described in Example I, the Polyamine H naphthenates were found to provide, for example, 98 percent protection at 200 p.p.m. concentration, thus showing great effectiveness as an inhibitor of corrosion normally caused by oil well fluids.

In copending application United States Serial No. 486,277 filed February 4, 1955 by the present inventor, of which application the present application is a continuation-in-part, the compositions disclosed and claimed herein are disclosed, and the inhibition of corrosion by oil well fluids by means of such compositions is claimed. In copending application Serial No. 583,901 filed May 10, 1956 by the present inventor as a continuation-in-part of application Serial No. 486,277, the latter being now abandoned, the compositions disclosed and claimed herein are disclosed, and the protection of ferrous metals from corrosion using such compositions as inhibitors is claimed.

The invention claimed is:

1. A new composition of matter selected from the group consisting of (1) salts of petroleum naphthenic acids having an average of at least about 18 carbon atoms per molecule with an aliphatic polyamine having the formula $RNH[(CH_2)_mNH]_nH$ where R is selected from the group consisting of hydrogen and the hydrocarbon radical of a naturally occurring fatty acid RCOOH, where $m$ is an integer from 2 to 5, and where $n$ is an integer from 1 to 10, said polyamine having at least 12 carbon atoms per molecule, (2) N-hydroxyalkyl derivatives of such salts wherein the hydroxyalkyl groups contain a total of 2 to 10 carbon atoms, and (3) N-polyoxyalkylene derivatives of such salts wherein the polyoxyalkylene groups contain a total of from 2 to 10 carbon atoms.

2. Composition according to claim 1 wherein said salts are neutral.

3. Composition according to claim 1 wherein said salts are basic.

4. Composition according to claim 1 wherein said polyamine has the formula $NH_2(CH_2CH_2NH)_nH$ where $n$ is an integer from 6 to 10.

5. Composition according to claim 1 wherein said polyamine has the formula $RNHCH_2CH_2CH_2NH_2$ where R is the hydrocarbon radical of a naturally occurring fatty acid RCOOH and has 11 to 20 carbon atoms.

6. Composition according to claim 1 and comprising said N-hydroxyalkyl derivatives.

7. Composition according to claim 1 and comprising said polyoxyalkylene derivatives.

8. Composition according to claim 1 wherein said polyamine has the formula $RNH(CH_2)_mNH_2$ where R is the hydrocarbon radical of a naturally occurring fatty acid RCOOH and has 11 to 20 carbon atoms, and $m$ is an integer from 2 to 5.

9. Composition according to claim 8 wherein $m$ is 3 and RCOOH is a mixture of fatty acids derived from tallow.

10. A new composition of matter comprising petroleum naphthenic acid salts of a polyamine residue obtained in the reaction of ethylene dichloride and ammonia to produce ethylene amines, after distillation of lower boiling ethylene amines from the reaction products, said salts being prepared from naphthenic acids having an average of at least about 18 carbon atoms per molecule.

References Cited in the file of this patent

UNITED STATES PATENTS

| | | |
|---|---|---|
| 2,186,249 | Lazar et al. | Jan. 9, 1940 |
| 2,401,993 | Wasson et al. | June 11, 1946 |
| 2,424,158 | Fuqua et al. | July 15, 1947 |
| 2,430,951 | Roualt | Nov. 18, 1947 |
| 2,587,546 | Matuszak | Feb. 26, 1952 |
| 2,736,658 | Pfohl et al. | Feb. 28, 1956 |
| 2,798,045 | Buck et al. | July 2, 1957 |
| 2,818,383 | Jolly | Dec. 31, 1957 |

FOREIGN PATENTS

| | | |
|---|---|---|
| 663,407 | Great Britain | Dec. 19, 1951 |